Jan. 14, 1930.                J. HAGEN                1,743,915
WINDOW WASHER'S SAFETY BELT TERMINAL
Filed Nov. 16, 1925
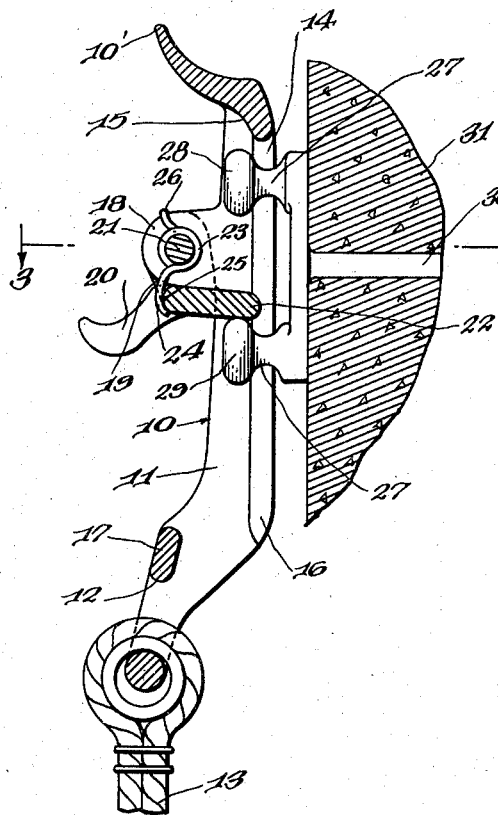
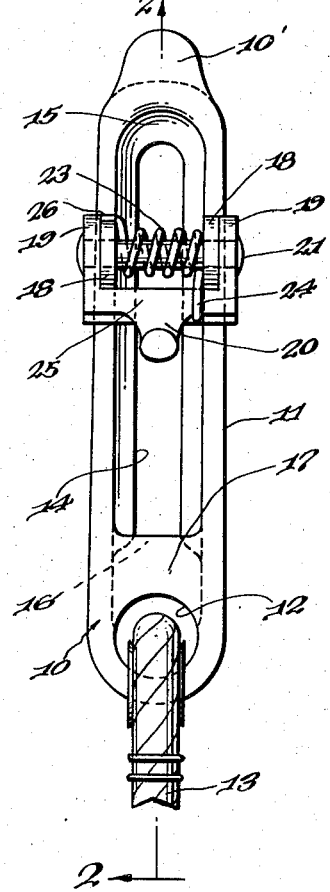
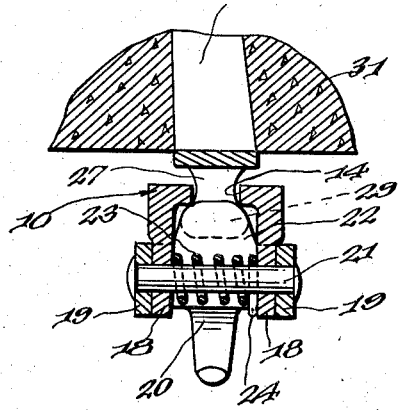
Joseph Hagen
Inventor
BY Victor J. Evans
ATTORNEY Patented Jan. 14, 1930

1,743,915

UNITED STATES PATENT OFFICE

JOSEPH HAGEN, OF CHICAGO, ILLINOIS

WINDOW-WASHER'S SAFETY-BELT TERMINAL

Application filed November 16, 1925. Serial No. 69,536.

This invention relates to new and useful improvements in window washer's safety belt terminals and has for its principal object the provision of an improved construction of this character which will be highly efficient in use and economical in manufacture.

Among the salient objects of the invention is the production of a device of this character which will be adapted for ready and expeditious unlocking and release and one which is equipped with an auxiliary safety stop to be brought into operation in emergency.

The invention consists in the combination and arrangement of parts hereinafter described and claimed.

The invention will be best understood by reference to the accompanying drawing forming a part of this specification and in which, Fig. 1 is an elevational view of the invention in its preferred form of construction, Fig. 2 is a sectional view taken substantially on line 2—2 of Fig. 1, and Fig. 3 is a sectional view taken substantially on line 3—3 of Fig. 2.

Referring to the drawing showing the preferred form of construction, a window washer's safety belt terminal is indicated at 10 and comprises a finger gripping portion 10' and a body 11 having an eye 12 formed in one end thereof to which the supporting cable 13 is attached in any suitable manner which will assure the greatest safety. A slot 14 is formed in the body 11 and extends longitudinally with respect thereto and terminates a suitable distance from the end 15 thereof and has an entrance 16 opposite and forwardly of the eye 12 beneath a bridge portion 17 of the body.

The body 11, on opposite sides of the slot 14, is provided with oppositely disposed lateral ears 18 which are adapted to coact with oppositely disposed ears 19 formed on a stop member 20 which is pivotally carried by the lateral ears 18 by means of a pin 21. The stop member 20 is normally held with a portion 22 thereof projecting into the slot 14 by means of a spring member 23 embracing the pin 21 with one end 24 in abutment with the bight portion 25 of the stop member and with the opposite end 26 in abutment with the body member.

The slot 14 is adapted to accommodate the shank portions 27 of anchor studs 28 and 29 which are formed integral with the anchor bolt 30 securely and permanently embedded in a wall 31 or the like.

In operation the terminal is positioned so as to permit the entrance of the anchor stud 28 into the slot 14 and this is accomplished by pivoting the stop member 20 in a direction about its pivot so as to lower the abutment 22 to permit the anchor stud 28 to pass within the slot to a predetermined distance from the termination of the slot. Upon passage of the anchor stud 28 to this position the stop member, which is manually manipulated by the thumb of the user, is released and permitted to return to its initial position and in such position the anchor stud 29 of the anchor bolt 30 will be in abutment therewith as shown in Fig. 2.

As herein stated the device serves auxiliary safety means in any of the following emergencies. Should the upper stud 25, break off for any reason such as a flaw in the metal, the body is still held in operative abutment between member 22 and the other stud 29. In the event the lower stud 29 breaks off, the body will drop the short distance between stud 28 and end 15. The latter safeguard is operative also in the event member 22 breaks or becomes disabled while the former safeguard is operative if end piece 15 should break off.

Another advantageous feature of my invention over similar devices now in use is that the projecting portion 22 bearing against the anchor stud 29, which is located at the lower portion of the anchor proper, forces this portion into bearing relation with the wall thereby relieving the anchor of a good deal of strain by reason of being reinforced by the wall due to the bearing relation and it is apparent that the terminal, when mounted in operative position, will not have the usual tendency to pull the anchor proper away from the wall.

From the foregoing description it is apparent that I provide a device of the character herein mentioned which is adapted to be released in a convenient manner and which can be readily mounted in operative position.

The device, of course, will be manufactured of such material as will be durable in use and which will be weather proof, free from rusting, or the like.

While I have shown and described the preferred form of my invention it is to be understood that various changes and alterations may be carried out during manufacture without departing from the spirit of the invention or the scope of the appended claims.

The invention having been set forth, what I claim as new and useful is:

1. A window washer's safety belt terminal including a pair of spaced apart anchor studs, a body having an open slot formed therein for the reception of said anchor studs, said body having ears formed on one face thereof on opposite sides of said slot, a pin carried by said ears, a latch having ears pivotally interconnected with said pin, said latch having a relatively flat portion extending into said slot and disposed transversely to the extent thereof between said anchor studs, a spring for urging said latch into said position, the upper face of the lowermost of said anchor studs engaging the lower face of said flat portion of said latch to support said body with the inner end of said slot in spaced relation with upper face of the upper of said studs.

2. A window washer's safety belt terminal including a pair of spaced apart vertically aligned anchor studs, a body having a slot extending therein from one end thereof for the reception of said anchor studs, a latch, means for supporting said latch on said body, yieldable means acting on said latch for holding a portion thereof in said slot transversely thereof intermediate said studs, means for limiting movement of said latch to locate said latch in said position, the lower surface of said portion of said latch engaging the upper surface of the lowermost of said studs to support said body with the inner end of said slot in spaced relation with the upper side of the upper of said studs.

In testimony whereof I affix my signature.

JOSEPH HAGEN.